(12) United States Patent
Sohn

(10) Patent No.: US 7,728,916 B2
(45) Date of Patent: Jun. 1, 2010

(54) LIQUID CRYSTAL DISPLAY DEVICE HAVING BENT SOURCE ELECTRODE AND BENT DRAIN ELECTRODE

(75) Inventor: Choong Yong Sohn, Cheongju-si (KR)

(73) Assignee: L.G. Display Co., Ltd., Seoul (KR)

(*) Notice: Subject to any disclaimer, the term of this patent is extended or adjusted under 35 U.S.C. 154(b) by 0 days.

(21) Appl. No.: 11/172,481

(22) Filed: Jun. 30, 2005

(65) Prior Publication Data
US 2006/0087599 A1    Apr. 27, 2006

(30) Foreign Application Priority Data
Oct. 27, 2004  (KR) ................... 10-2004-0086277

(51) Int. Cl.
G02F 1/136 (2006.01)
H01L 27/14 (2006.01)

(52) U.S. Cl. ............... 349/43; 349/41; 349/42; 349/46; 257/72

(58) Field of Classification Search ............. 349/42, 349/43
See application file for complete search history.

(56) References Cited

U.S. PATENT DOCUMENTS

| | | | | |
|---|---|---|---|---|
| 5,247,375 A * | 9/1993 | Mochizuki et al. | ............. | 349/84 |
| 6,157,048 A * | 12/2000 | Powell | ............. | 257/59 |
| 6,281,552 B1 * | 8/2001 | Kawasaki et al. | ............. | 257/350 |
| 6,661,493 B2 * | 12/2003 | Chang et al. | ............. | 349/141 |
| 6,713,793 B1 * | 3/2004 | Suzuki et al. | ............. | 257/276 |
| 7,130,000 B2 * | 10/2006 | Kim | ............. | 349/43 |
| 2001/0003477 A1 * | 6/2001 | Aoki et al. | ............. | 349/152 |
| 2002/0036743 A1 * | 3/2002 | Youn et al. | ............. | 349/141 |
| 2002/0186331 A1 * | 12/2002 | Chung | ............. | 349/43 |
| 2005/0092994 A1 * | 5/2005 | Ishige | ............. | 257/72 |
| 2006/0033105 A1 * | 2/2006 | Fujii et al. | ............. | 257/66 |

* cited by examiner

*Primary Examiner*—David Nelms
*Assistant Examiner*—Lauren Nguyen
(74) *Attorney, Agent, or Firm*—Brinks Hofer Gilson & Lione

(57) ABSTRACT

A liquid crystal display device includes a liquid crystal display panel. A drive circuit part is formed in the display panel. The drive circuit has a switching device with thin film transistors. The transistors commonly use one gate electrode and are connected in parallel. The switching device includes a gate electrode, a gate insulating film covering the gate electrode, a semiconductor pattern which overlaps the gate electrode with the gate insulating film therebetween, and source and drain electrodes which are formed on the semiconductor pattern and face each other. The source and drain electrodes, as well as a channel between the source and drain electrodes, are bent in the same direction.

19 Claims, 10 Drawing Sheets

LIQUID CRYSTAL DISPLAY DEVICE HAVING BENT SOURCE ELECTRODE AND BENT DRAIN ELECTRODE

This application claims the benefit of the Korean Patent Application No. P2004-86277 filed on Oct. 27, 2004, which is hereby incorporated by reference.

FIELD OF THE INVENTION

The present invention relates to a liquid crystal display device, and more particularly to a liquid crystal display device that is adaptive for minimizing the area of a drive circuit part, and a fabricating method thereof.

DESCRIPTION OF THE RELATED ART

Generally, a liquid crystal display device controls the light transmissivity of liquid crystal by use of electric field, thereby displaying a picture. For this, the liquid crystal display device, as shown in FIG. 1, includes a liquid crystal display panel 5 where liquid crystal cells are arranged in a matrix shape, and a drive circuit part 7 to drive the liquid crystal display panel.

Gate lines and data lines are arranged to cross each other in the liquid crystal display panel 5 and a liquid crystal cell is located at each of areas which are provided by the crossing of the gate lines and the data lines. Pixel electrodes and a common electrode are provided in the liquid crystal display panel 5 to apply electric field to each of the liquid crystal cells. Each of the pixel electrodes is connected to any one of the data lines through the source and drain terminal of a thin film transistor TFT which is a switching device. The gate electrode of the TFT is connected to any one of the gate lines which let a pixel voltage signal be applied to pixel electrodes of one line. The TFT permits a pixel voltage, which is supplied to the data line, to be charged in the corresponding pixel electrode in response to a gate high voltage Vgh which is supplied to the gate line. That is, the liquid crystal cells are charged with the corresponding pixel voltage from the data line when the TFT is turned on by the gate high voltage Vgh which is sequentially supplied to the gate line, and they sustain the charged voltage until the TFT is turned on again. The pixel voltage charged in the liquid crystal cell of an arbitrary $n^{th}$ gate line is sustained by a storage capacitor Cst which is formed by the overlapping of the corresponding pixel electrode and the previous stage gate line. For each frame, only while the corresponding gate line is driven, i.e., during one horizontal period when the pixel voltage is applied to the pixel electrode, the gate high voltage Vgh is supplied to each of the gate lines and a gate low voltage Vgl is supplied during the remaining period. The storage capacitor Cst sustains the voltage, which is charged in the current stage pixel electrode, by the gate low voltage Vgl which is supplied to the previous gate line.

The drive circuit part 7 includes a gate driver 27 to drive the gate lines, a data driver 17 to drive the data lines, a timing controller 11 to control the gate driver 27 and the data driver 17, and a power supplier (not shown) to supply various drive voltages which are used in the liquid crystal display device. The timing controller 11 controls the drive timing of the gate driver 27 and the data driver 17 and supplies a pixel data signal to the data driver 17. The power supplier generates the drive voltages such as the gate high voltage Vgh and the gate low voltage Vgl which are used in the liquid crystal display device, by using the input power. The gate driver 27 sequentially supplies a scan signal to the gate lines to sequentially drive the liquid crystal cells on the liquid crystal display panel by the one line portion. The data driver 17 supplies the pixel voltage signal to each of the data lines whenever the scan signal is supplied to any one of the gate lines. Accordingly, the liquid crystal display device controls the light transmissivity by the electric field which is applied between the pixel electrode and the common electrode in accordance with the pixel voltage signal by liquid crystal cells, thereby displaying a picture.

The data driver 17 and the gate driver 27 which are directly connected to the liquid crystal display panel 5 are integrated into a plurality of integrated circuits IC. The integrated data drive IC 15 and gate drive IC 25 are each mounted on a tape carrier package TCP to be connected to the liquid crystal display panel by a tape automated bonding (TAB) method, or mounted on the liquid crystal display panel by a chip-on-glass (COG) method.

Herein, the drive IC's 15, 25 connected to the liquid crystal display panel by the TAB method through the TCP's 13, 23 receive the control signals and the DC voltages which are inputted from the outside through the signal lines mounted on a printed circuit board PCB 31, 33 that is connected to the TCP's 13, 23, and the drive IC's 15, 25 are connected to each other. More specifically, the data drive IC's 15 are connected in series through the signal lines mounted on the data PCB 31 and commonly receive the control signals and the pixel data signal from the timing controller 11 and the drive voltages from the power supplier. The gate drive IC's 25 are connected in series through the signal lines mounted on the gate PCB 33 and commonly receive the control signals from the timing controller and the drive voltages from the power supplier.

In this way, in order to make the liquid crystal display device thinner and to reduce the manufacturing cost, the gate drive circuit has recently been formed in the liquid crystal display panel as in FIG. 2. Alternatively, the data drive circuit has been partially formed, as well as the gate drive circuit, in the liquid crystal display panel, as shown in FIG. 3.

In the drive circuit part of the liquid crystal display device like this, a switching device is used which has been proposed in the U.S. Pat. No. 6,552,768 and which is formed in one big thin film transistor. Such a big thin film transistor is formed of amorphous silicon which has relatively good uniformity rather than polysilicon, which is difficult to form by laser crystallization of the silicon layer, even though it has a rapid response speed.

FIG. 4 is a plane view specifically representing a switching device 50 formed of one thin film transistor shown in FIG. 3, and FIG. 5 is a sectional diagram illustrating the switching device taken along the line I-I' of FIG. 4.

Referring to FIGS. 4 and 5, the switching device 50 formed of one thin film transistor includes a gate electrode 56 formed on a lower substrate 51, a source electrode 60 connected to a source line 64, a drain electrode 72 facing the source electrode 60 and connected to a drain line 73, and a semiconductor layer 68 which has a gate insulating film 44 therebetween with the gate electrode 56 and forms a channel 82 between the source electrode 60 and the drain electrode 72. Herein, the semiconductor layer 68 includes an active layer 46 and an ohmic contact layer 45 in ohmic contact with the source electrode 60 and the drain electrode 72. Herein, the switching device 50 of the drive circuit is driven at a relatively high current, thus it has a relatively big channel width W1. For example, the channel width of the thin film transistor fonned at the pixel area is about several or scores of microns (μm), but the channel width of the switching device in the drive circuit is about hundreds or tens of thousands of microns (μm).

In this way, as shown in FIGS. 2 and 3, if the drive circuit part is formed in the liquid crystal display panel, the width of the outer part of a picture display area becomes wider by the area which is occupied by the circuit driver, thus increasing the panel size.

SUMMARY OF THE INVENTION

By way of introduction only, in one aspect, a liquid crystal display device comprises a liquid crystal display panel including a drive circuit. The drive circuit has a switching device that includes: a gate electrode; a gate insulating film covering the gate electrode; a semiconductor pattern that overlaps the gate electrode with the gate insulating film therebetween; and a plurality of source electrodes and drain electrodes which are formed on the semiconductor pattern and face each other, at least one of the source electrodes and a facing drain electrode are bent in the same direction.

In another aspect, a liquid crystal display device comprises a liquid crystal display panel having a drive circuit formed therein. The drive circuit has a switching device that includes: a gate electrode; a gate insulating film covering the gate electrode; a semiconductor pattern that overlaps the gate electrode with the gate insulating film therebetween; a plurality of bent source electrodes formed on the semiconductor pattern and connected to a common source line; and a plurality of bent drain electrodes that are formed on the semiconductor pattern, oppose the source electrodes, and are connected to a common drain line.

In another aspect, a method of fabricating a liquid crystal display device comprises: forming a drive circuit that includes a switching device, which has a bent channel, on a liquid crystal display panel.

BRIEF DESCRIPTION OF THE DRAWINGS

The following detailed description of the embodiments of the present invention reference the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Hereinafter, the preferred embodiments of the present invention will be described in detail with reference to FIGS. 6 to 8C.

Figure 1:
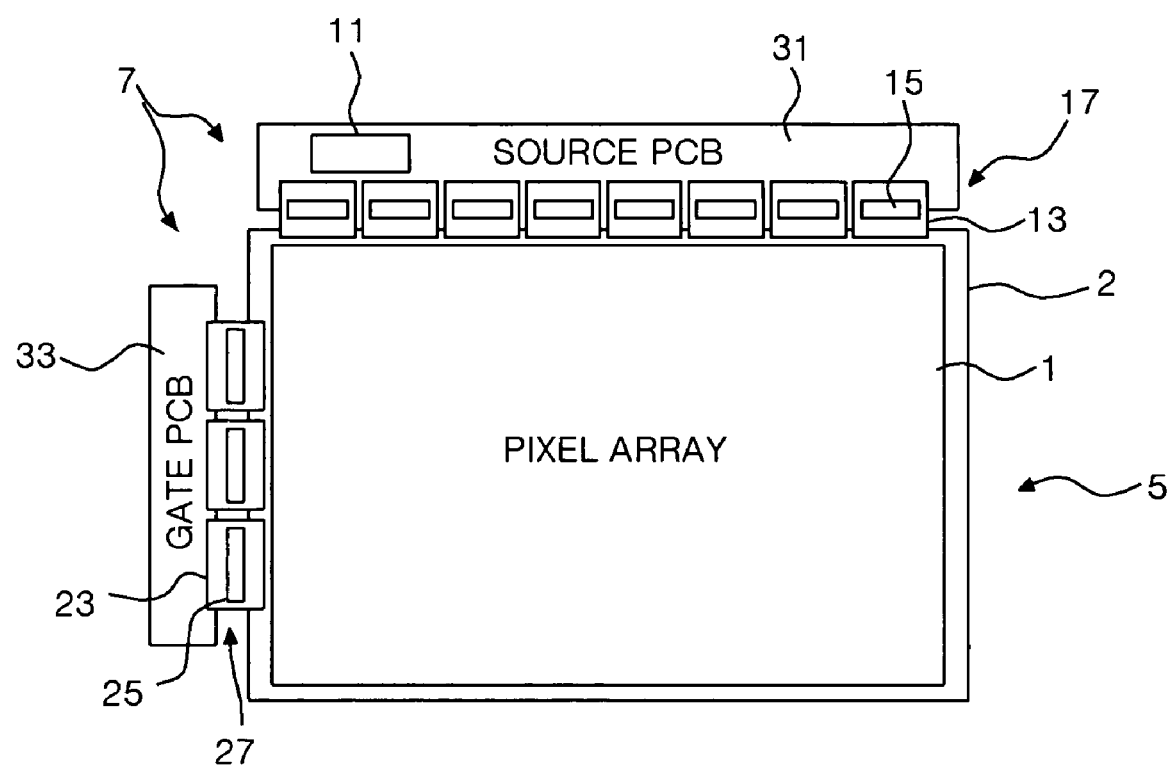
FIG. 1 is a plane view briefly illustrating a composition of a related art liquid crystal display device.
Figure 2:
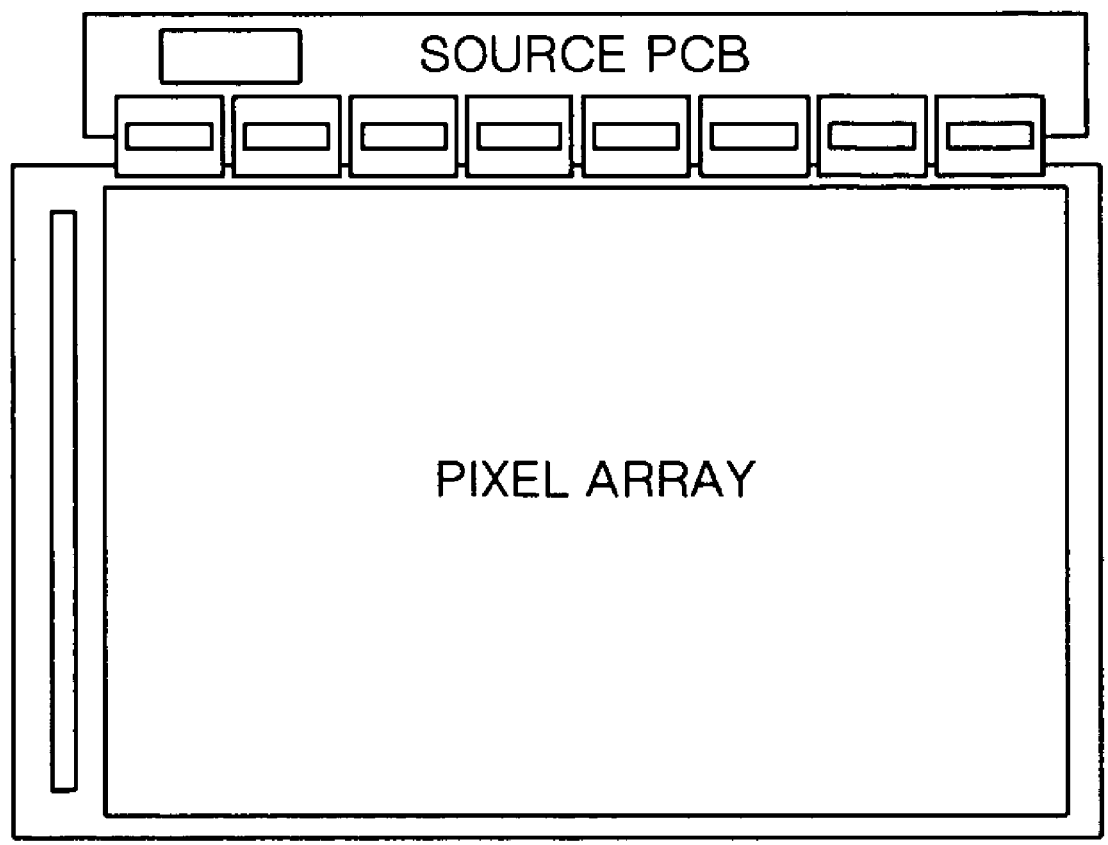
FIG. 2 is a plane view briefly illustrating a liquid crystal display device in which a gate drive circuit is formed within a liquid crystal display panel.
Figure 3:
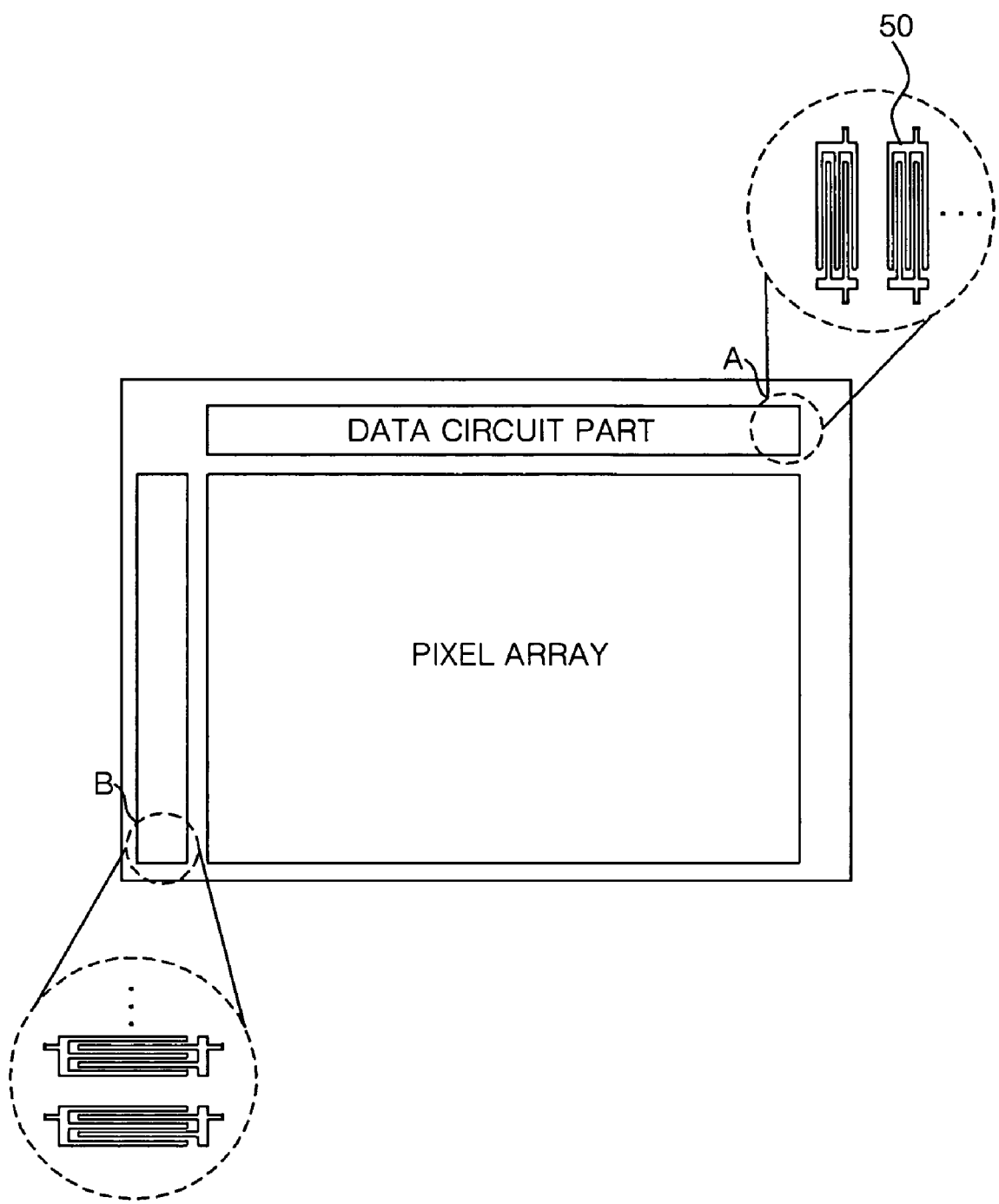
FIG. 3 is a plane view briefly illustrating a liquid crystal display device in which at least one of a gate drive circuit, a data drive circuit and a drive circuit is formed within a liquid crystal display panel.
Figure 4:
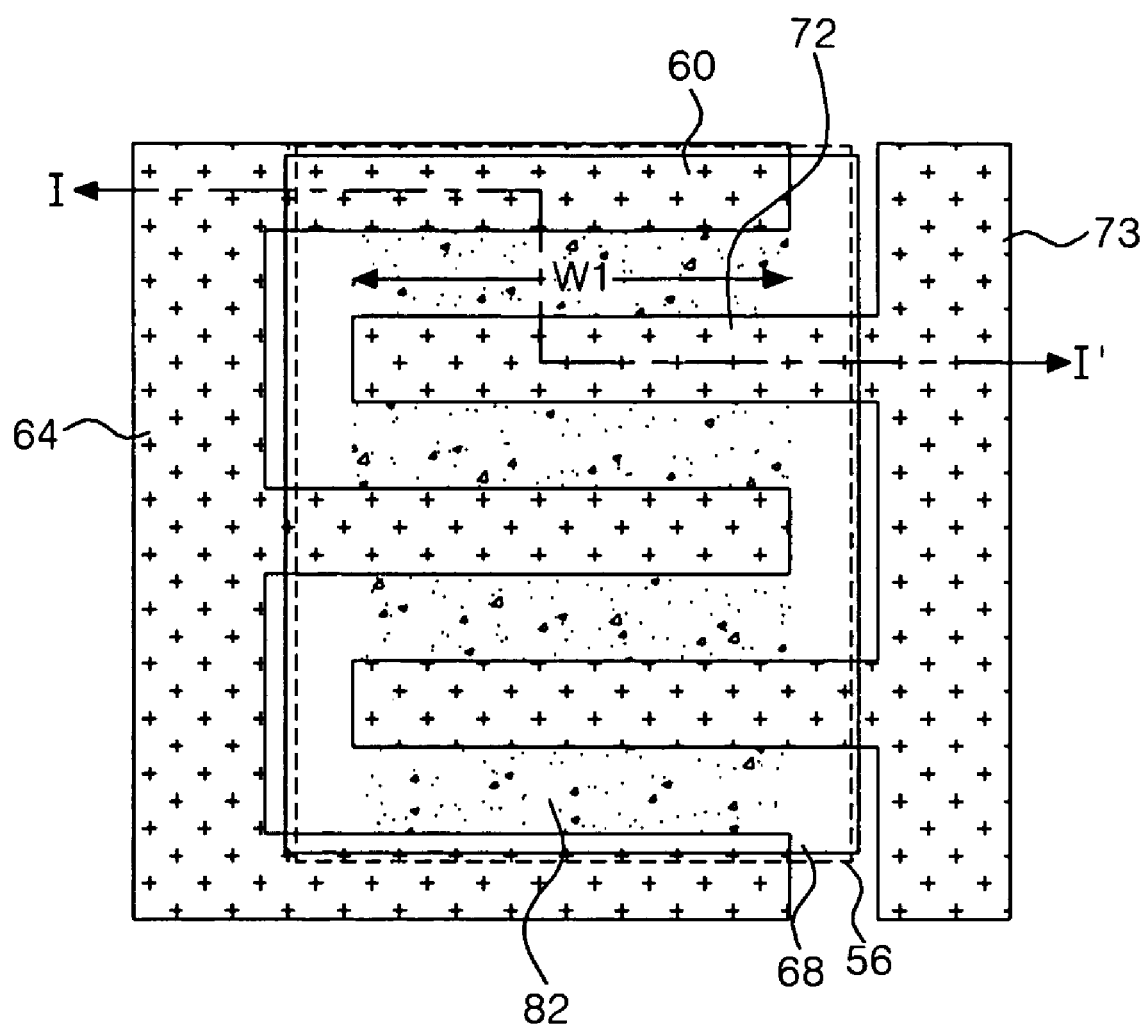
FIG. 4 is a plane view illustrating a switching device composed of a plurality of thin film transistors which are formed in a drive circuit of a liquid crystal display device.
Figure 5:
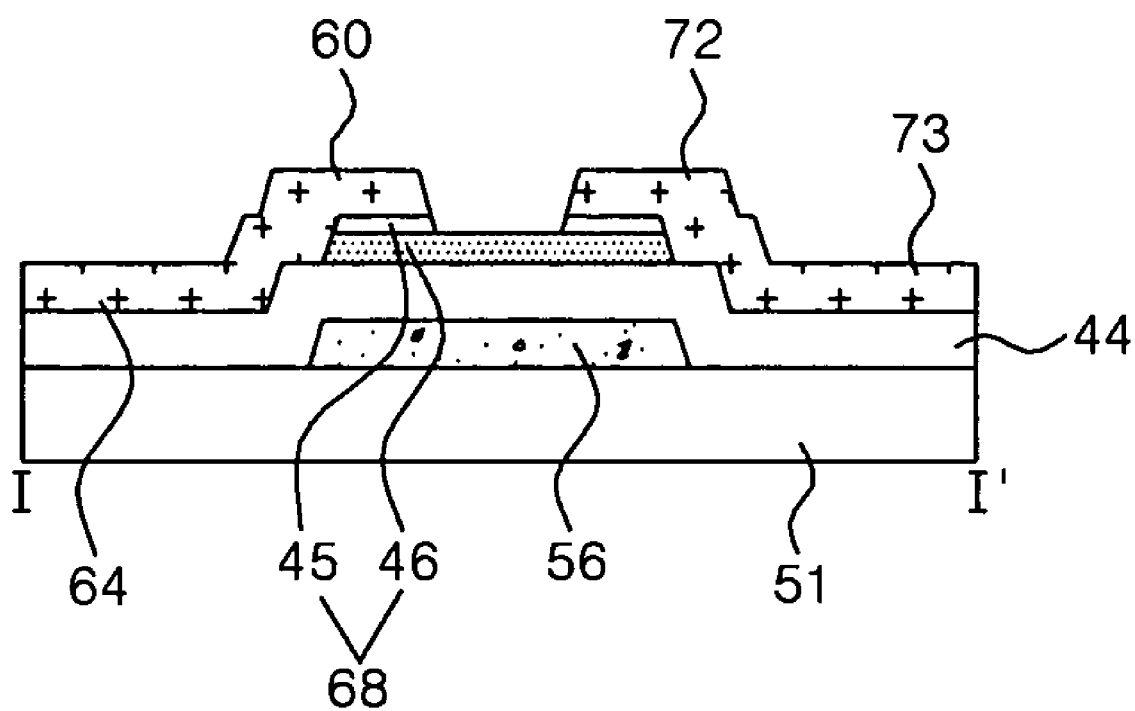
FIG. 5 is a sectional diagram illustrating the switching device shown in FIG. 4, taken along the line I-I'.
Figure 6:
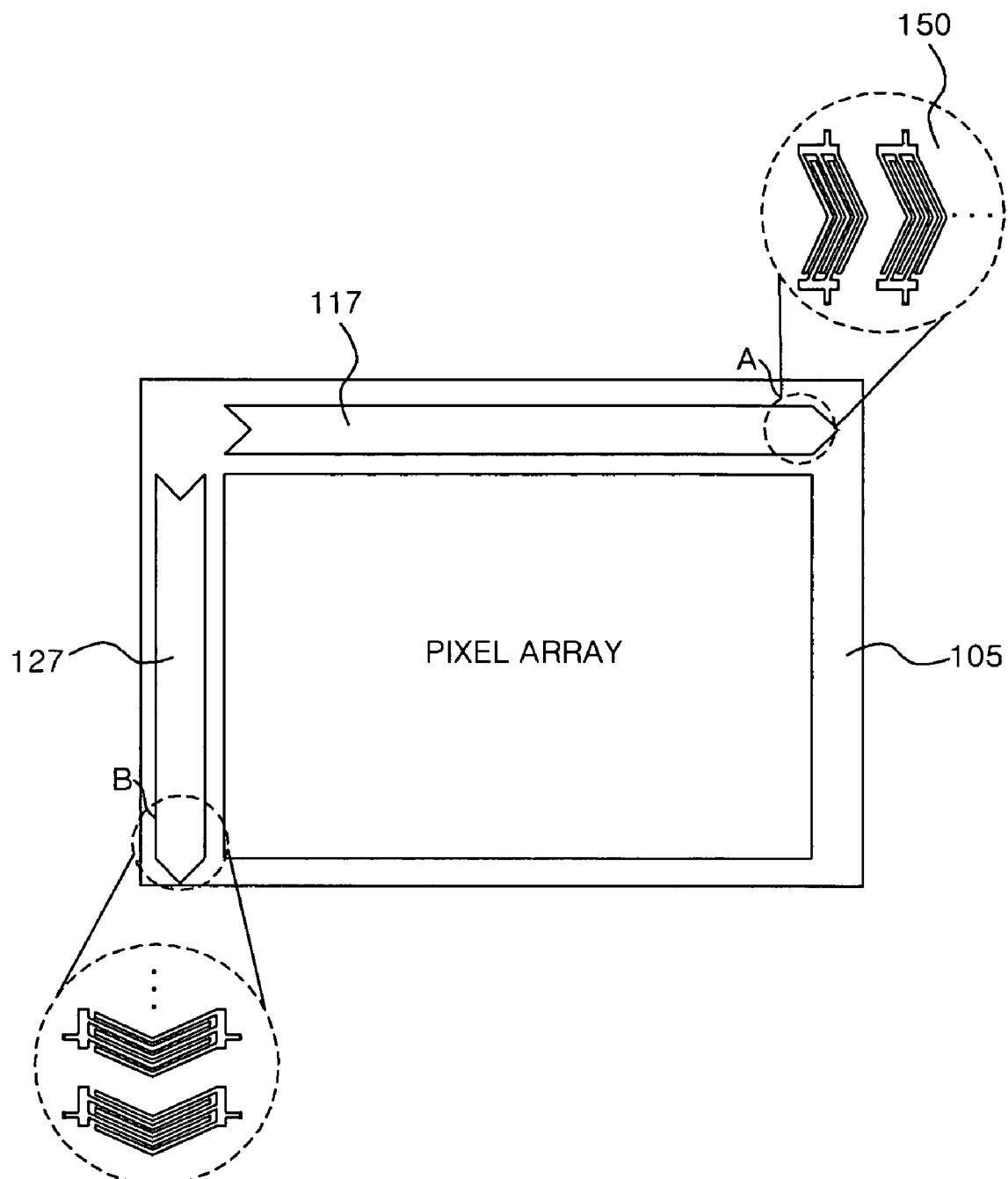
FIG. 6 is a diagram representing a liquid crystal display device according to an embodiment of the present invention.

FIG. 6 is a diagram briefly representing a liquid crystal display device according to an embodiment of the present invention.

Referring to FIG. 6, the liquid crystal display device includes a liquid crystal display panel 105 where liquid crystal cells are arranged in a matrix shape, and a gate drive circuit part 127 and a data drive circuit part 117 formed on the liquid crystal display panel 105. Herein, at least one of the gate drive circuit part 127 and the data drive circuit part 117 is formed on the liquid crystal display panel 105.

Gate lines and data lines are arranged to cross each other in the liquid crystal display panel 105 and a liquid crystal cell is located at each of areas which are provided by the crossing of the gate lines and the data lines. Pixel electrodes and a common electrode are provided in the liquid crystal display panel 105 to apply electric field to each of the liquid crystal cells. Each of the pixel electrodes is connected to any one of the data lines through the source and drain terminal of a thin film transistor TFT which is a switching device. The gate electrode of the TFT is connected to any one of the gate lines which let a pixel voltage signal applied to pixel electrodes of one line. The TFT permits a pixel voltage, which is supplied to the data line, to be charged in the corresponding pixel electrode in response to a gate high voltage Vgh which is supplied to the gate line. That is, the liquid crystal cells are charged with the corresponding pixel voltage from the data line when the TFT is turned on by the gate high voltage Vgh which is sequentially supplied to the gate line, and they sustain the charged voltage until the TFT is turned on again. The pixel voltage charged in the liquid crystal cell of an arbitrary $n^{th}$ gate line is sustained by a storage capacitor Cst which is formed by the overlapping of the corresponding pixel electrode and the previous stage gate line. For each frame, only while the corresponding gate line is driven, i.e., during one horizontal period when the pixel voltage is applied to the pixel electrode, the gate high voltage Vgh is supplied to each of the gate lines and a gate low voltage Vgl is supplied during the remaining period. The storage capacitor Cst is used if a charge voltage is sustained by always applying the storage signal by an independent storage line, i.e., a storage-on-common method, and if the voltage charged in the current stage pixel electrode is sustained by the gate low voltage supplied to the previous stage gate line, i.e., a storage-on-gate method. The storage capacitor Cst sustains the voltage, which is charged in the current stage pixel electrode, by the gate low voltage Vgl which is supplied to the previous gate line.

The gate drive circuit part 127 supplies a gate signal to the gate line for driving the gate lines of the liquid crystal display panel 105, and the data drive circuit part 117 supplies a data signal to the data line for driving the data lines of the liquid crystal display panel 105.

A switching device 150 formed of one big thin film transistor is used for the gate and data drive circuit parts 127, 117. Such a big thin film transistor is formed of amorphous silicon which has relatively good uniformity and is easier to produce than polysilicon, in which laser crystallization of the silicon layer is difficult even though polysilicon has a rapid response speed.

Figure 7:
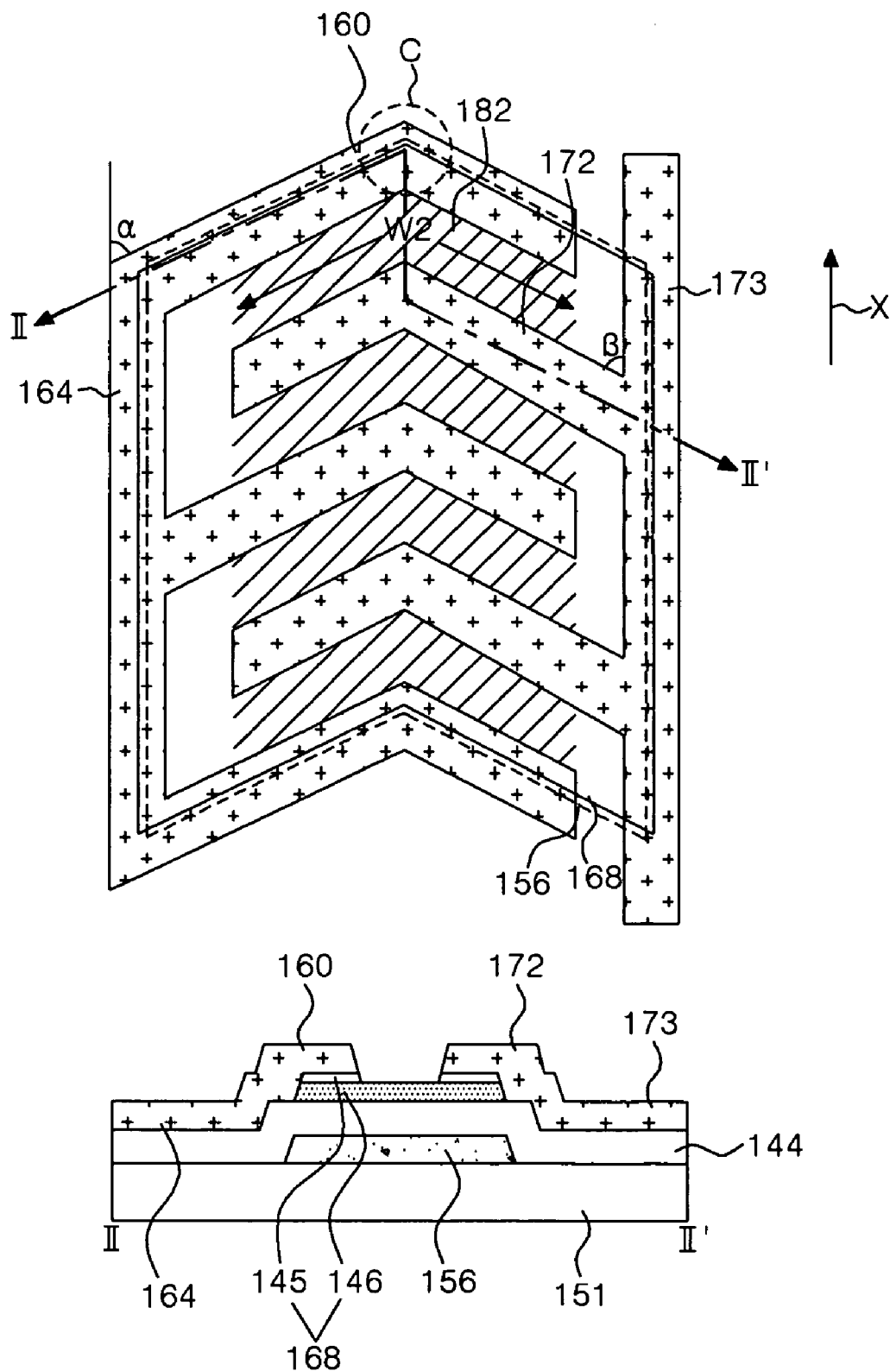
FIG. 7 is a plane view and a sectional diagram representing the switching device shown in FIG. 6 in detail.

FIG. 7 is a plane view and a sectional diagram specifically representing the switching device shown in FIG. 6.

The switching device 150 shown in FIG. 7 has a plurality of thin film transistors that commonly use one gate electrode 156 and are connected in parallel, thus it has a relatively wider channel width W2 for the switching of relatively high voltage.

The switching device 150 includes a gate electrode 156 formed on a substrate 151, a gate insulating film 144 formed to cover the gate electrode 156, a semiconductor pattern 168 to overlap the gate electrode 156 with a gate insulating film 144 therebetween, a plurality of source electrodes 160 and drain electrodes 172 which are formed on the semiconductor pattern 168, face each other in a zigzag shape, a "V" shape and a "U" shape and has a bent area (C) in a first direction (X), a source line 164 commonly connected to the source electrodes 160, and a drain line 173 commonly connected to the drain electrodes 172.

The gate electrode 156 is directly formed on the substrate 151 to connect the thin film transistors in parallel. The semiconductor pattern 168 has an active layer 146 and an ohmic contact layer 145 for being in ohmic contact with the source electrode 160 and the drain electrode 172. Herein, the gate electrode 156 and the semiconductor pattern 168 are bent in the same direction as the bending direction of the source electrode 160 and the drain electrode 172, the gate electrode 156 has a wider width than the semiconductor pattern 168 to reduce a leakage current, and the width of the gate electrode 156 is reduced to decrease the area of the thin film transistor.

The source electrodes 160 and the drain electrodes 172 are bent in a specific direction, thereby broadening the width of the channel 182 formed between the source electrode 160 and the drain electrode 172 in comparison with the related art. As a result, the distance between the source line 164 and the drain line 173 can be made narrower than the related art, thus the area occupied by the drive circuit part in the liquid crystal display panel is reduced.

In other words, even though the distance between the source line 164 and the drain line 173 becomes narrower, the channel 182 is formed in a bent structure so that the channel width W2 for switching high voltage can be provided. Hereby, the area that the drive circuit part occupies on the liquid crystal display panel 105 decreases, thus it is possible to make the outer area of the display area of the liquid crystal display panel narrow and to make the liquid crystal display device compact.

Herein, a first tilt angle (α) between the source electrode 160 and the source line 164 is the same as a second tilt angle (β) between the drain electrode 172 and the drain line 173. For example, the first tilt angle (α) and the second tilt angle (β) are about 30°~60°.

Figure 8A:
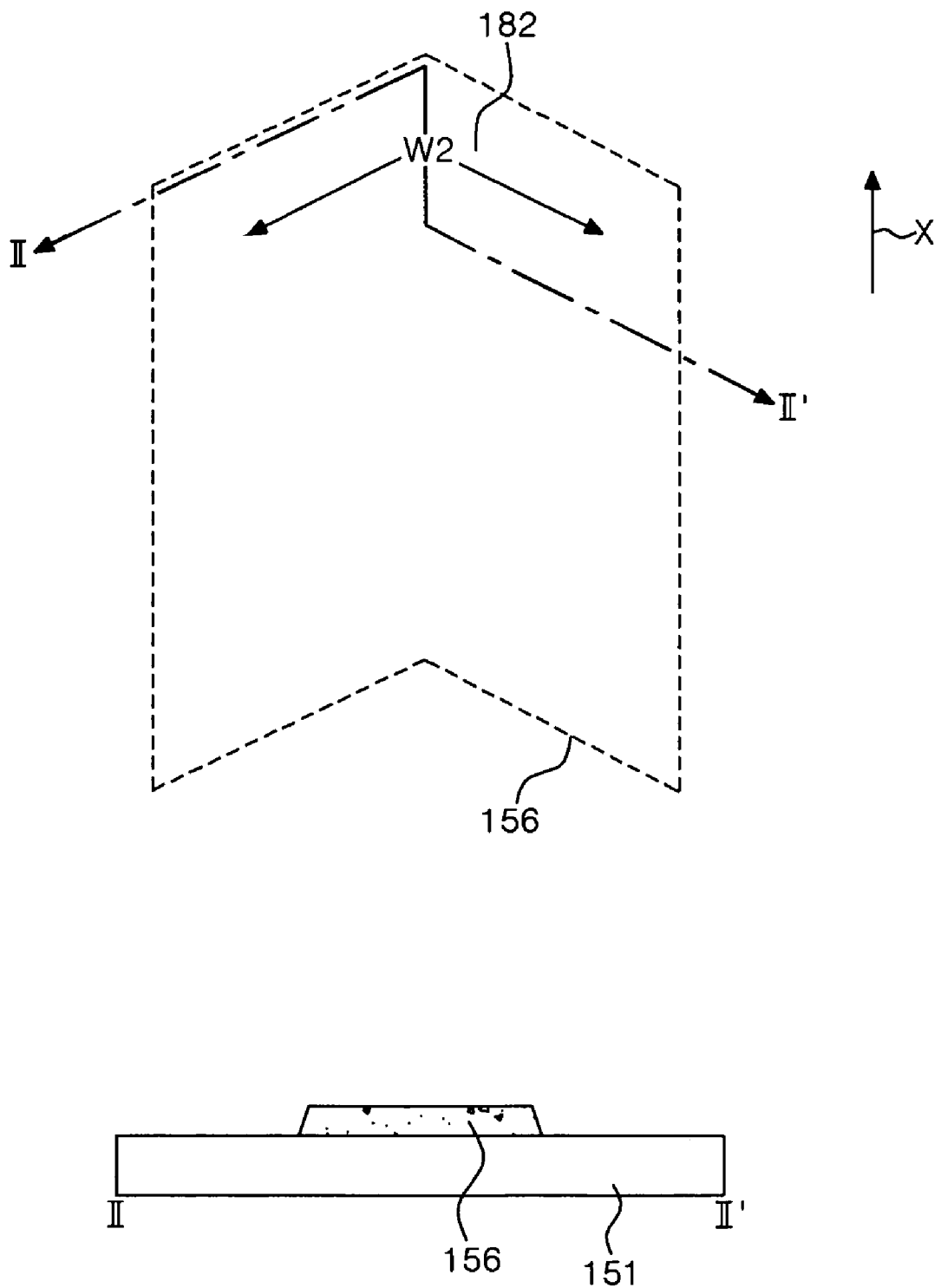
FIGS. 8A to 8C are diagrams explaining a fabricating method of the switching device shown in FIG. 7.
Figure 8B:
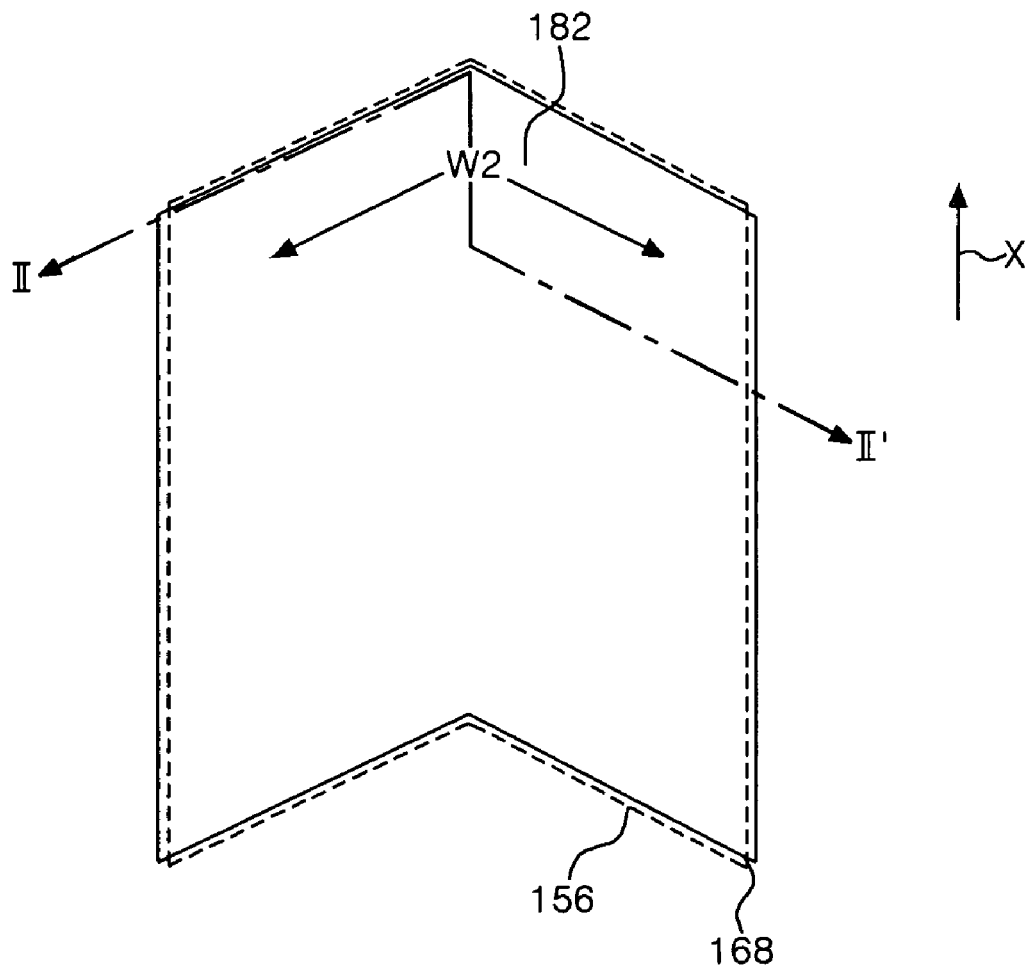
Figure 8B:
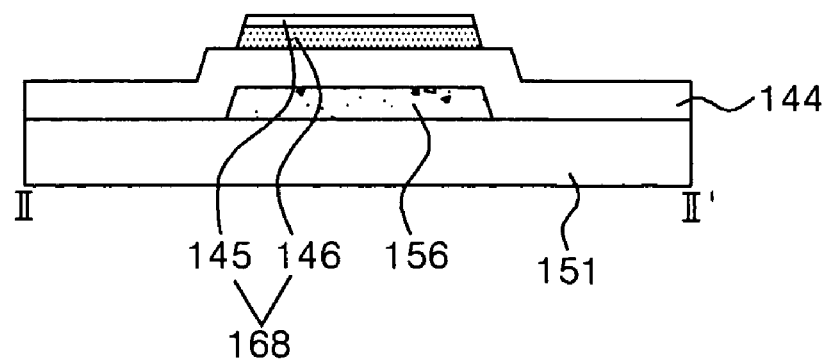
Figure 8C:
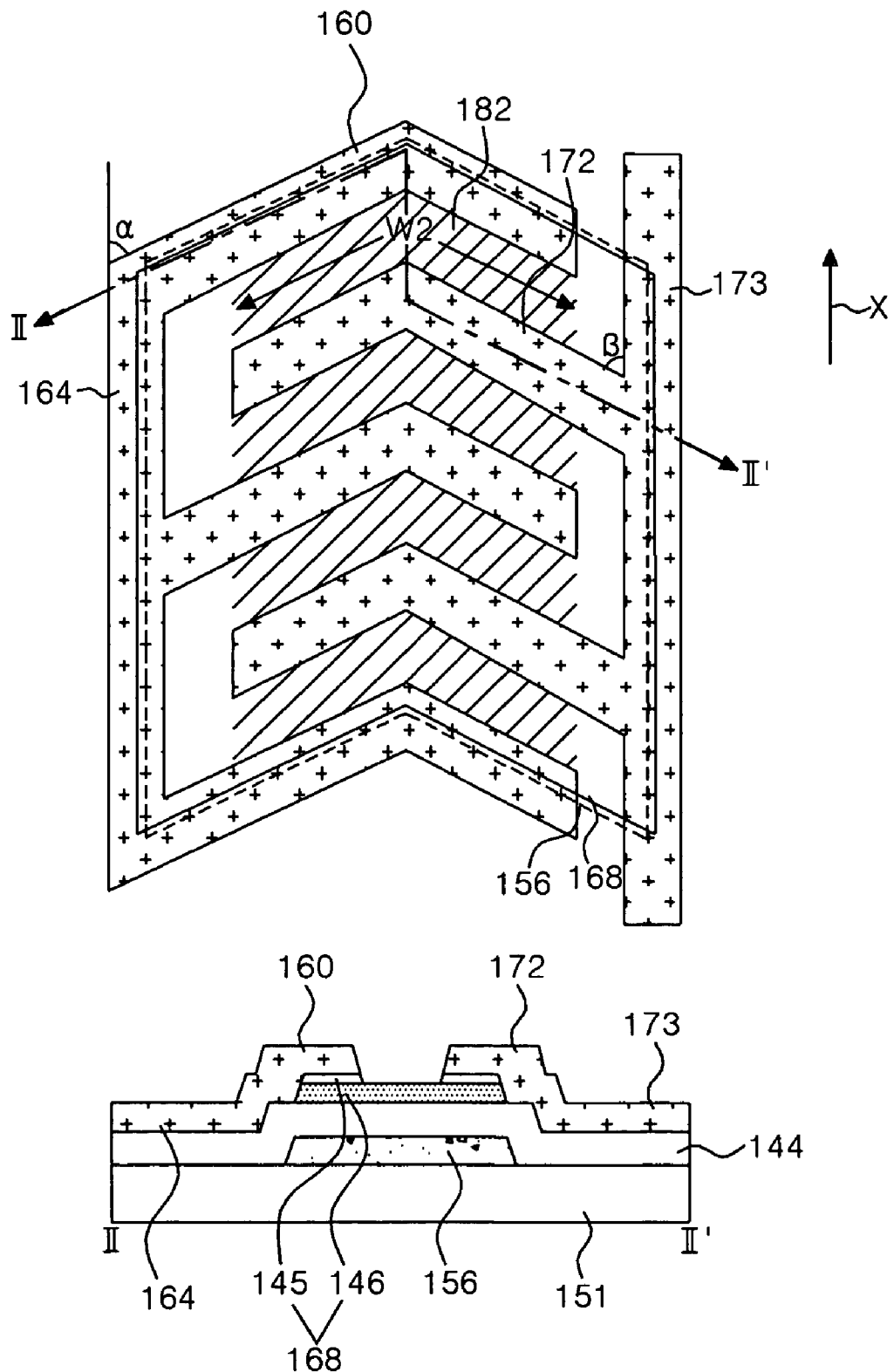

FIGS. 8A to 8C are plane views and sectional diagrams for explaining a fabricating method of the switching device shown in FIG. 6.

After depositing a gate metal layer on the substrate 151 by a deposition method such as sputtering, the gate metal layer is patterned by a photolithography process using a mask and an etching process. Accordingly, as shown in FIG. 8A, the gate electrode 156 is formed. Herein, the gate metal is of chrome Cr, molybdenum Mo, an aluminum group metal and soon in a single or double layer structure.

A gate insulating film 144 is formed on the substrate 151 where the gate electrode 156 is formed. An inorganic insulating material such as silicon oxide SiOx or silicon nitride SiNx is used as a material of the gate insulating film 144.

An amorphous silicon layer and an n+ amorphous silicon layer are sequentially formed by a deposition method such as PECVD and sputtering on the substrate 151 where the gate insulating film 144 is formed.

The amorphous silicon layer and the n+ amorphous silicon layer are patterned by photolithography using a mask and the etching process. Accordingly, a semiconductor pattern 168 is formed as shown in FIG. 8B. The semiconductor pattern 168 has an active layer 146 and an ohmic contact layer 145.

A source/drain metal layer is formed on the entire surface of the substrate 151 where the semiconductor pattern 168 is formed, by a deposition method such as PECVD, sputtering and so on.

After a photo-resist pattern is formed on the source/drain metal layer by the photolithography process using a mask, the source/drain metal layer is patterned by a wet etching process using the photo-resist pattern. Accordingly, there are formed a source line 164 and a drain line 173 located in parallel with a designated gap therebetween; a plurality of source electrodes 160 which form the first tilt angle with the source line 164, are commonly connected and have a structure where they are bent in a first direction (X); and a plurality of drain electrodes 172 which form the second tilt angle with the drain line 173, are commonly connected and are bent in the first direction (X).

Then, the ohmic-contact layer 146 of the channel part 182 is etched using the source electrode 160 and the drain electrode 172 as a mask, thereby exposing the active layer 146 of the channel part 182 as shown in FIG. 8C. Herein, the source/drain metal is chrome Cr, molybdenum Mo, thallium Tl, titanium Ti, tantalum Ta, molybdenum Mo alloy, aluminum group metal and so on, and the source/drain metal layer has a single or double layer structure.

As described above, in the liquid crystal display device and the fabricating method thereof according to the present invention, the driving circuit has a switching device where a plurality of source electrodes and drain electrodes face each other and are bent in the same direction, thereby forming a channel of a bent structure. Accordingly, the channel width can be broadened in comparison with the related art, and at the same time, the distance between the source line and the drain line can be made narrow, thereby reducing the area that the drive circuit part occupies on the liquid crystal display panel. Hereby, the area that the drive circuit part occupies in the liquid crystal display panel is reduced to enable to make the width of the outer part of the display area of the liquid crystal display panel narrow, thereby enabling the liquid crystal display device to be compact.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device comprising:
   a liquid crystal display panel including liquid crystal cells and a drive circuit to drive the liquid crystal cells;
   the liquid crystal cells arranged in a matrix shape, each of the liquid crystal cells including a pixel electrode, a common electrode and a thin film transistor;
   the drive circuit having a switching device that includes:
   a gate electrode;
   a gate insulating film covering the gate electrode;
   a semiconductor pattern that overlaps the gate electrode with the gate insulating film therebetween; and
   a plurality of source electrodes and drain electrodes which are formed on the semiconductor pattern and face each other, at least one of the source electrodes and a facing drain electrode being bent in the same direction and disposed within the periphery of the semiconductor pattern; and,
   a channel formed in a bent structure between the source electrode and drain electrode, wherein the bent portions of the source electrode and drain electrode are disposed within the periphery of the semiconductor pattern, and further comprising;

a source line to which the source electrodes are commonly connected; and a drain line to which the drain electrodes are commonly connected and which is parallel to the source line, wherein the source electrodes are connected to and form a first tilt angle with the source line, and the drain electrodes are connected to and form a second tilt angle with the drain line, wherein each of the source and drain electrodes is bent in at least one of a "V" shape or a "U" shape symmetrically around a direction of the source and drain lines, and each of a central portions of the source and drain electrodes with the "V" shape or the "U" shape is disposed on the semiconductor pattern, wherein the switching device contains a plurality of thin film transistors that commonly use the gate electrode and are connected in parallel, and wherein the gate electrode, the semiconductor pattern, the source electrodes and the drain electrodes are symmetrically bent on a center line which is parallel to the source line and the drain line and is located at the center of the semiconductor pattern.

2. The liquid crystal display device according to claim 1, wherein the semiconductor pattern includes a channel provided between the bent source electrode and drain electrode.

3. The liquid crystal display device according to claim 1, wherein the drive circuit comprises a gate drive circuit.

4. The liquid crystal display device according to claim 3, wherein the drive circuit comprises a data drive circuit.

5. The liquid crystal display device according to claim 1, wherein the first tilt angle and the second tilt angle are the same and are about 30°~60°.

6. The liquid crystal display device according to claim 1, wherein the gate electrode and the semiconductor pattern are bent in the same direction as a bending direction of the source electrode and the drain electrode.

7. A liquid crystal display device comprising:

a liquid crystal display panel having liquid crystal cells and a drive circuit formed therein to drive the liquid crystal cells, the liquid crystal cells arranged in a matrix shape, each of the liquid crystal cells including a pixel electrode, a common electrode and a thin film transistor;

the drive circuit having a switching device, the switching device including:

a gate electrode;

a gate insulating film covering the gate electrode;

a semiconductor pattern that overlaps the gate electrode with the gate insulating film therebetween;

a plurality of bent source electrodes formed on the semiconductor pattern and connected to a common source line; and a plurality of bent drain electrodes that are formed on the semiconductor pattern, opposite the source electrodes, and are connected to a common drain line;

a channel formed in a bent structure between the source electrode and drain electrode, and wherein the source electrodes are connected to and form a first tilt angle with the source line, and the drain electrodes are connected to and form a second tilt angle with the drain line, wherein each of the source and drain electrodes is bent in at least one of a "V" shape or a "U" shape symmetrically around a direction of the source and drain lines, and each of a central portions of the source and drain electrodes with the "V" shape or the "U" shape is disposed on the semiconductor pattern, wherein the switching device contains a plurality of thin film transistors that are connected in parallel, each transistor containing the gate electrode, the gate insulating film, the semiconductor pattern, and the bent source and drain electrodes, the gate electrode being commonly used by all of the transistors, and wherein the gate electrode, the semiconductor pattern, the source electrodes and the drain electrodes are symmetrically bent on a center line which is parallel to the source line and the drain line and is located at the center of the semiconductor pattern.

8. The liquid crystal display device according to claim 7, wherein the source and drain electrodes maintain a constant width therebetween along a length of the source and drain electrodes.

9. The liquid crystal display device according to claim 7, wherein the drive circuit comprises a gate drive circuit.

10. The liquid crystal display device according to claim 9, wherein the drive circuit comprises a data drive circuit.

11. The liquid crystal display device according to claim 7, wherein the source and drain electrodes form tilt angles of about 30°~60° with the source and drain lines, respectively.

12. The liquid crystal display device according to claim 7, wherein the semiconductor pattern covers an area bounded by the source and drain lines and the source and drain electrodes.

13. A method of fabricating a liquid crystal display device, comprising:

forming liquid crystal cells arranged in a matrix shape on a liquid crystal display panel, forming a drive circuit that includes a switching device on the liquid crystal display panel, the switching device comprising a semiconductor pattern, and a plurality of source electrodes and drain electrodes which are disposed on the semiconductor pattern and face each other, at least one of the plurality of source electrodes and a facing drain electrode being bent in the same direction and disposed within the periphery of the semiconductor pattern, wherein the switching device includes a bent channel provided between the bent source electrode and drain electrode, wherein the bent portions of the source electrode and drain electrode are disposed within the periphery of the semiconductor pattern, and wherein the source electrodes are connected to and form a first tilt angle with a source line, and the drain electrodes are connected to and form a second tilt angle with a drain line, wherein each of the source and drain electrodes is bent in at least one of a "V" shape or a "U" shape symmetrically around a direction of the source and drain lines, and each of a central portions of the source and drain electrodes with the "V", shape or the "U" shape is disposed on the semiconductor pattern, wherein each of the liquid crystal cells includes a pixel electrode, a common electrode and a thin film transistor, wherein the switching device contains a plurality of thin film transistors that commonly use the gate electrode and are connected in parallel, and wherein the gate electrode, the semiconductor pattern, the source electrodes and the drain electrodes are symmetrically bent on a center line which is parallel to the source line and the drain line and is located at the center of the semiconductor pattern.

14. The method according to claim 13, wherein each of the source and drain electrodes are bent in the same direction.

15. The method according to claim 14, wherein the channel maintains a constant width between the facing source and drain electrodes.

16. The method according to claim 15, wherein the source and drain electrodes form tilt angles of about 30°~60° with source and drain lines, respectively.

17. The method according to claim 13, wherein the drive circuit comprises a gate drive circuit.

18. The method according to claim 17, wherein the drive circuit comprises a data drive circuit.

19. A liquid crystal display panel comprising liquid crystal cells and a drive circuit, the liquid crystal cells arranged in a matrix shape, each of the liquid crystal cells including a pixel electrode, a common electrode and a thin film transistor;

the device circuit having a switching device that includes:

a gate electrode;

a gate insulating film covering the gate electrode;

a semiconductor pattern that overlaps the gate electrode with the gate insulating film therebetween; and a plurality of source electrodes and drain electrodes which are formed on the semiconductor pattern and face each other, at least one of the source electrodes and a facing drain electrode being bent in the same direction and disposed within the periphery of the semiconductor pattern; and, a channel formed in a bent structure between the source electrode and drain electrode, wherein the bent portions of the source electrode and drain electrode are disposed within the periphery of the semiconductor pattern, wherein the source electrodes are connected to and form a first tilt angle with a source line, and the drain electrodes are connected to and form a second tilt angle with a drain line, wherein each of the source and drain electrodes is bent in at least one of a "V" shape or a "U" shape symmetrically around a direction of the source and drain lines, and each of a central portions of the source and drain electrodes with the "V" shape or the "U" shape is disposed on the semiconductor pattern, wherein the switching device contains a plurality of thin film transistors that commonly use the gate electrode and are connected in parallel, and wherein the gate electrode, the semiconductor pattern, the source electrodes and the drain electrodes are symmetrically bent on a center line which is parallel to the source line and the drain line and is located at the center of the semiconductor pattern.

* * * * *